United States Patent
Bonne et al.

(10) Patent No.: US 12,487,627 B1
(45) Date of Patent: Dec. 2, 2025

(54) CONFIGURABLE SYSTEM COUNTER BASED ON A HARDWARE CLOCK FREQUENCY

(71) Applicant: Amazon Technologies, Inc., Seattle, WA (US)

(72) Inventors: Itamar Bonne, Maccabim (IL); Ofer Naaman, Hod Hasharon (IL); Benny Pollak, Yad Binyamin (IL); Max Chvalevsky, Mevaseret Zion (IL)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 18/374,597

(22) Filed: Sep. 28, 2023

(51) Int. Cl.
*G06F 1/08* (2006.01)

(52) U.S. Cl.
CPC ...................... *G06F 1/08* (2013.01)

(58) Field of Classification Search
CPC .......................................................... G06F 1/08
See application file for complete search history.

(56) References Cited

U.S. PATENT DOCUMENTS

| | | | |
|---|---|---|---|
| 5,818,847 A * | 10/1998 | Zak ........................ | G06F 11/076 713/502 |
| 7,519,845 B2 * | 4/2009 | Chen .................. | H04N 21/4305 713/400 |
| 8,913,632 B2 | 12/2014 | Aweya et al. | |
| 9,972,402 B2 * | 5/2018 | Bhushan Singh | G11C 29/12015 |
| 10,707,984 B2 | 7/2020 | Pitigoi-Aron | |
| 11,061,802 B2 * | 7/2021 | Chapman ................. | G06F 9/542 |
| 11,287,843 B2 * | 3/2022 | Woodhead ................. | G06F 1/12 |
| 12,063,683 B2 * | 8/2024 | Zewail ................ | H04W 74/002 |
| 12,082,039 B2 * | 9/2024 | Ying .................... | H04L 61/5038 |
| 2015/0016476 A1 * | 1/2015 | Herzog .................. | H04J 3/0635 370/503 |
| 2016/0054780 A1 * | 2/2016 | Bodas .................... | H04L 47/783 713/320 |
| 2017/0132064 A1 * | 5/2017 | McClintock ............ | G06F 11/34 |
| 2018/0137276 A1 * | 5/2018 | Su ......................... | H03D 13/001 |
| 2019/0195948 A1 * | 6/2019 | Kaur ....................... | G11C 29/021 |
| 2019/0379475 A1 * | 12/2019 | Seethamraju .......... | H04J 3/0688 |
| 2020/0313663 A1 * | 10/2020 | Zeng ................... | H03K 5/00006 |
| 2021/0356986 A1 * | 11/2021 | Chang ......................... | G06F 1/12 |
| 2023/0035110 A1 * | 2/2023 | Dahle ...................... | H03L 7/195 |
| 2023/0108841 A1 * | 4/2023 | Palla ....................... | H03L 7/085 327/156 |
| 2024/0039545 A1 * | 2/2024 | Singh ...................... | H03L 7/195 |
| 2024/0171185 A1 * | 5/2024 | Huang .................... | H03L 7/195 |
| 2024/0373362 A1 * | 11/2024 | Banerjea ................ | G06F 1/3209 |

\* cited by examiner

*Primary Examiner* — Aurel Prifti
(74) *Attorney, Agent, or Firm* — Knobbe, Martens, Olson & Bear, LLP

(57) ABSTRACT

Systems and methods are provided to generate time data according to a nominal frequency and based on an available frequency. A hardware clock of the system can operate according to the available frequency. The system can identify a difference between the available frequency and a nominal frequency. Based on the difference, the system can generate time data according to the nominal frequency. To generate the time data, for each clock cycle of a plurality of clock cycles according to the available frequency, the system can determine whether to increment or maintain a value of the time data for a prior clock cycle of the plurality of clock cycles. The system can perform one or more functions based on the time data.

21 Claims, 7 Drawing Sheets

200A

| Remainder | Second Time Data | First Time Data | Real Time (nanosecs) |
|---|---|---|---|
| 0 | 0 | 0 | 0 |
| 400 | 1 | 1 | 0.714286 |
| 800 | 2 | 2 | 1.428571 |
| 1200 | 2 | 3 | 2.142857 |
| 200 | 3 | 4 | 2.857143 |
| 600 | 4 | 5 | 3.571429 |
| 1000 | 4 | 6 | 4.285714 |
| 0 | 5 | 7 | 5 |
| 400 | 6 | 8 | 5.714286 |
| 800 | 7 | 9 | 6.428571 |
| 1200 | 7 | 10 | 7.142857 |
| 200 | 8 | 11 | 7.857143 |
| 600 | 9 | 12 | 8.571429 |
| 1000 | 9 | 13 | 9.285714 |
| 0 | 10 | 14 | 10 |

| | | |
|---|---|---|
| 201A | Available Frequency | 1400 MHz |
| 201B | Nominal Frequency | 1000 MHz |

FIG. 2A

| Remainder | Second Time Data | First Time Data | Real Time (nanosecs) |
|---|---|---|---|
| 0 | 0 | 0 | 0 |
| 200 | 1 | 1 | 1.25 |
| 400 | 2 | 2 | 2.5 |
| 600 | 4 | 3 | 3.75 |
| 0 | 5 | 4 | 5 |
| 200 | 6 | 5 | 6.25 |
| 400 | 7 | 6 | 7.5 |
| 600 | 9 | 7 | 8.75 |
| 0 | 10 | 8 | 10 |
| 200 | 11 | 9 | 11.25 |
| 400 | 12 | 10 | 12.5 |
| 600 | 14 | 11 | 13.75 |
| 0 | 15 | 12 | 15 |

| | |
|---|---|
| Available Frequency | 800 MHz |
| Nominal Frequency | 1000 MHz |

FIG. 2B

| Remainder (222) | Second Time Data (224) | First Time Data (226) | Real Time (nanosecs) (228) |
|---|---|---|---|
| 0 | 0 | 0 | 0 |
| 300 | 2 | 1 | 1.25 |
| 600 | 2 | 2 | 2.5 |
| 100 | 4 | 3 | 3.75 |
| 400 | 6 | 4 | 5 |
| 700 | 6 | 5 | 6.25 |
| 200 | 8 | 6 | 7.5 |
| 500 | 8 | 7 | 8.75 |
| 0 | 10 | 8 | 10 |
| 300 | 12 | 9 | 11.25 |
| 600 | 12 | 10 | 12.5 |
| 100 | 14 | 11 | 13.75 |
| 400 | 16 | 12 | 15 |

| | | |
|---|---|---|
| 221A | Available Frequency | 800 MHz |
| 221B | Nominal Frequency | 1000 MHz |
| 223 | Scaled Nominal Frequency | 500 MHz |

FIG. 2C

| Remainder (232) | Second Time Data (234) | First Time Data (236) | Real Time (nanosecs) (238) |
|---|---|---|---|
| 0 | 0 | 0 | 0 |
| 600 | 2 | 1 | 1.25 |
| 1200 | 4 | 2 | 2.5 |
| 200 | 4 | 3 | 3.75 |
| 800 | 6 | 4 | 5 |
| 1400 | 8 | 5 | 6.25 |
| 400 | 8 | 6 | 7.5 |
| 1000 | 10 | 7 | 8.75 |
| 0 | 10 | 8 | 10 |
| 600 | 12 | 9 | 11.25 |
| 1200 | 14 | 10 | 12.5 |
| 200 | 14 | 11 | 13.75 |
| 800 | 16 | 12 | 15 |

| | |
|---|---|
| 221A Available Frequency | 800 MHz |
| 221B Nominal Frequency | 1000 MHz |
| 233 Scaled Available Frequency | 1600 MHz |

FIG. 2D

CONFIGURABLE SYSTEM COUNTER BASED ON A HARDWARE CLOCK FREQUENCY

BACKGROUND

Computing systems may utilize clocks to perform various functions. In some cases, computing systems may utilize multiple clocks that operate according to different sets of operating parameters (e.g., frequencies) to satisfy different requirements. For example, a computing system may utilize multiple clocks that are each configured according to the requirements of particular components of the computing system. In some cases, the computing system may utilize 1) multiple component clocks and/or 2) a system clock and a component clock that are each configured differently according to the different requirements of the system and/or the components. As each clock may be implemented using hardware resources, the use of multiple clocks can increase resource utilization and can negatively impact the user experience.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 2A, 2B, 2C, and 2D are pictorial diagrams of example time data according to a nominal frequency and based on an available frequency.

DETAILED DESCRIPTION

Figure 1:
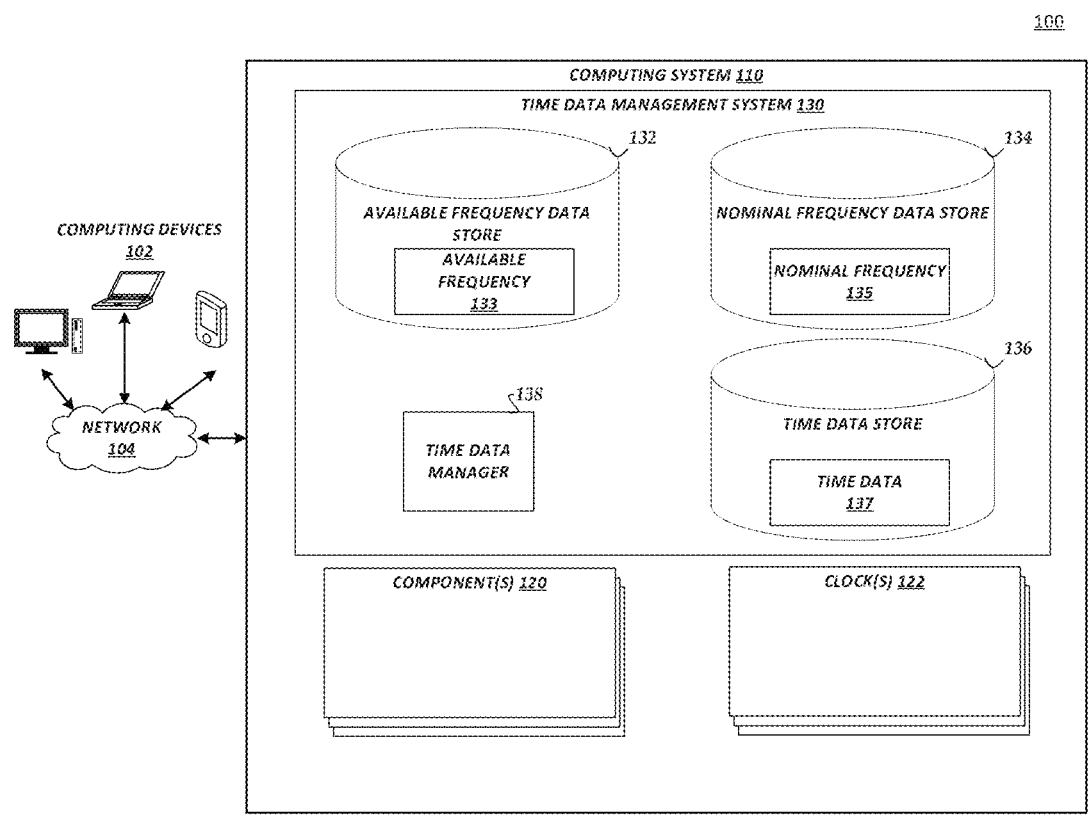
FIG. 1 is a block diagram depicting an illustrative environment in which a time data management system can generate time data according to a nominal frequency and based on an available frequency.

Generally described, aspects of the present disclosure relate to the generation of time data according to a first set of operating parameters (e.g., a nominal frequency) and based on a second set of operating parameters (e.g., an available frequency). The generation of time data according to a nominal (e.g., a configurable, customizable, variable, etc.) frequency enables a user to customize the time data according to the nominal frequency without requiring implementation of a separate hardware clock operating at the nominal frequency. Instead, the time data can be determined based on an available frequency (e.g., a frequency of a clock available to the computing system) that may be different from the nominal frequency. For example, the time data according to the nominal frequency can be determined based on an available frequency of an available hardware clock. Such a time data generation enables the operation of computing systems (e.g., components of the computing systems) according to a nominal frequency without implementation of a dedicated hardware clock operating at the nominal frequency. More specifically, embodiments of the present disclosure relate to improving the usability and effectiveness of a computing system such that the computing system can perform functions based on nominal frequencies.

As described in detail herein, a time data management system may provide a service enabling the customization of a nominal frequency for the performance of particular functions. In some cases, the time data management system may provide an interface through which the nominal frequency may be defined. The time data management system may enable users to submit a nominal frequency for the performance of the particular functions. For example, a user may define the nominal frequency as 1000 Megahertz ("MHz") via one or more interactions with the interface.

The time data management system may utilize the nominal frequency and an available frequency to determine (e.g., generate) time data according to the nominal frequency. As the time data management system may determine the time data according to the nominal frequency and based on the available frequency, the time data may be different from time data determined based on the output of a clock operating at the nominal frequency. However, all or a portion of the time data determined according to the nominal frequency and based on the available frequency may be within a threshold value of the time data determined based on the output of a clock operating at the nominal frequency for the same clock cycle.

One issue that may be of particular concern in computing systems is the difficulty in measuring time reliably for the performance of different functions. Many computing devices utilize crystal oscillators to track time. The oscillators may operate at a particular frequency (or within a particular frequency range), and thus time can be measured by the signal provided by an oscillator. The frequency of the oscillator and/or the frequency range within which the frequency varies may be fixed based on a plurality of factors such as hardware considerations. For example, a particular hardware component of the computing system may require a clock (and an oscillator) to operate at a particular frequency (e.g., 800 MHz) based on the operations to be performed by the hardware component (e.g., performance tracking, process execution, process scheduling, performance calculating, etc.). To perform additional functions at different frequencies, additional clocks may be implemented within the system.

Components and/or the computing system operating at incorrect frequencies may cause substantial issues. For example, a component of a computing system may utilize a clock operating at 800 MHz. If the computing system or a different component of the computing system is desired to and/or set to operate according to a different frequency (e.g., 1000 MHz), but operates at the available frequency of the clock of the component (e.g., 800 MHz), the functions performed by the computing system and/or the different component may be erroneous (e.g., the timing of the functions may be erroneous). For example, if the computing system is scheduling processes, calculating performance, etc. using the available frequency of the clock of the component (e.g., 800 MHz), the output will be substantially different (e.g., process will be scheduled at incorrect times, the calculated performance will be incorrect, etc.) than if the computing system operated at the set or desired frequency (e.g., 1000 MHz). The difference in outputs may cause cascading (cumulative) issues and/or may reduce the functionality of the computing system (e.g., the computing system may be restricted to operating at an available frequency) which may result in an undesirable user experience.

While such inaccuracies and/or deviations may be trivial in non-computerized environments, such inaccuracies and/ or deviations can create significant problems in computerized environments. For example, in a computing system, many different functions may be performed simultaneously and/or iteratively. If the computing system is unable to accurately determine when a function is to be performed, perform a function at a particular time, compare the results of a function performed at a first time to a function performed at a second time, etc., significant and cascading issues can result. In another example, some computer applications demand highly accurate timestamping, which in turn requires highly accurate time data. If the computing system is unable to determine the time data with a high accuracy, the performance of the computing system may be subsequently diminished.

In some embodiments, a user may implement clocks at all or a portion of the frequencies (e.g., both nominal and available frequencies). For example, a computing system may include component clocks for each component utilizing a particular frequency and/or a system clock for the computing system to perform particular system functions according to a particular frequency. Further, a user may modify the computing system to include different clocks operating at different frequencies based on functions to be performed. However, this approach is unwieldy and not feasible at large scale due to the cost and complexity of the addition and/or modification of the clocks. For example, the performance of functions at a nominal frequency in such systems may require implementation of an additional clock operating at the nominal frequency which can be expensive, complex, and time-consuming.

Embodiments of the present disclosure address the above-noted problems by enabling a time data management system to determine (e.g., generate) time data (e.g., a measurement of time, a count, timing data, a timing difference, etc.) according to a nominal frequency (e.g., a nominal frequency indicative of a plurality of clock cycles of a clock operating according to the nominal frequency) and based on an available frequency (e.g., for each clock cycle of a plurality of a clock cycles of a clock operating according to the available frequency). For example, the time data may be an estimated count of clock processes of a clock operating at the nominal frequency for each clock cycle of a plurality of clock cycles according to an available frequency. Further, the time data management system can determine the time data according to a nominal frequency without implementation of a clock operating at the nominal frequency. The use of such time data retains the advantages offered by utilizing time data generated according to a nominal frequency (e.g., and performing functions according to the time data) while also retaining the advantages of a computing system that does not include a clock operating at the nominal frequency. Additionally, the use of such time data can reduce costs associated with the implementation of a clock operating at the nominal frequency and/or performance issues, due, for example, to performing functions according to the available frequency.

More specifically, embodiments of the present disclosure enable time data to be determined according to a nominal frequency using the output of an available clock (e.g., operating at an available frequency). A time data management system may identify the nominal frequency and the available frequency and determine the time data using the nominal frequency and the available frequency. Because the time data is determined according to the nominal frequency using the available frequency and without implementation of a clock according to the nominal frequency, all or a portion of the values of the time data determined according to the nominal frequency using the available frequency may not match all or a portion of the values of the time data determined based on a clock operating at the nominal frequency. However, the time data management system may maintain the variance between the time data determined according to the nominal frequency using the available frequency and time data determined based on a clock operating at the nominal frequency within a particular time range (e.g., 0.625 nanoseconds, 0.5 nanoseconds, etc.), a particular count (e.g., 1, 2, etc.), etc. The time data management system may maintain the variance such that the variance is less than or equal to a threshold (e.g., 0.625 nanoseconds). The time data management system may maintain the variance such that the time data determined according to the nominal frequency using the available frequency may be used in place of the time data determined based on a clock operating at the nominal frequency to perform functions. Further, the time data management system may maintain the variance such that functions performed according to the time data determined according to the nominal frequency using the available frequency may have minimal timing differences (e.g., 0.625 nanoseconds) as compared to functions performed according to the time data determined based on a clock operating at the nominal frequency. This can enable the time data to be utilized by components that may operate at the nominal frequency.

The time data determined by the time data management system may be a measurement of time, a count, etc. For example, the time data may be a count (e.g., an estimated count) of clock processes (e.g., oscillations) of a clock (e.g., a desired system clock not included within the computing system). The count may be indicative of a plurality of clock cycles according to the nominal frequency.

In some cases, to determine the time data, the time data management system may increment a counter to determine the time data. For example, the time data can include increments of whole numbers (e.g., 1, 2, 3, 4, 5, etc.). In order to determine the time data, the time data management system may adjust how the counter is incremented (e.g., the time data management system may skip one or more increments).

The time data management system may determine a value of the time data for each clock cycle of a plurality of clock cycles (e.g., every nanosecond, every two nanoseconds, every 0.5 nanoseconds, etc.) according to the available frequency. For example, the available frequency may be 800 MHz and each clock cycle of a plurality of clock cycles according to the available frequency may be 1.25 nanoseconds (1/800 MHz). Therefore, to determine the time data, the time data management system may determine a value of the time data according to the nominal frequency at each clock cycle based on the available frequency (e.g., every 1.25 seconds). While a value of time data determined according to the available frequency may be incremented uniformly at each clock cycle (e.g., because the clock cycles are according to the available frequency), the value of the time data determined according to the nominal frequency may not be incremented uniformly at each clock cycle based on the difference between the nominal frequency and the available frequency. For example, if the nominal frequency (e.g., 1000 MHz) is greater than the available frequency (e.g., 800 MHz), the time data management system may increment the value of the time data according to the nominal frequency multiple increments in a single clock cycle (e.g., from 1 to 3) to account for the nominal frequency being a greater frequency as compared to the available frequency. In another example, if the nominal frequency (e.g., 1000 MHz) is less than the available frequency (e.g., 1400 MHz), the time data management system may not increment the value of the time data in a particular clock cycle to account for the nominal frequency being a lesser frequency as compared to the available frequency. By adjusting the time data according to the nominal frequency, the time data management system can account for determining the time data based on a plurality of clock cycles according to the available frequency (e.g., instead of a plurality of clock cycles according to the nominal frequency). Further, the time data management system can determine the time data according to the nominal frequency without implementation of a clock according to the nominal frequency.

Embodiments of the present disclosure enable time data to be generated according to a nominal frequency and based on the available frequency by utilizing a manner of time data generation to determine the time data. The manner of time data generation may indicate a particular clock cycle of the plurality of clock cycles according to the available frequency at which the time data management system is to skip one or more increments (e.g., skip multiple increments, skip incrementing, etc.) for a given clock cycle (e.g., interval). For example, the time data management system can increment the time data from 0 to 1 in a first clock cycle and from 1 to 3 in a second clock cycle that is immediately subsequent (e.g., in time) to the first clock cycle. In some cases, the time data management system can skip one or more increments by maintaining a value of the time data from a prior clock cycle for a given clock cycle (e.g., the time data management system may not increment the time data for a given clock cycle). For example, the time data management system can increment the time data from 0 to 1 in a first clock cycle and may maintain the value of the time data at 1 in a second clock cycle that is immediately subsequent to the first clock cycle.

The time data management system may identify the manner of time data generation (e.g., from a plurality of manners of time data generation) based on the available frequency and the nominal frequency. In some cases, the time data management system can compare the available frequency to the nominal frequency and identify the manner of time data generation based on the comparing the available frequency to the nominal frequency. For example, the time data management system can identify a first manner of time data generation based on determining the nominal frequency is less than or equal to the available frequency and a second manner of time data generation based on determining the nominal frequency is greater than the available frequency.

As discussed below, all or a portion of the plurality of manners of time data generation may include one or more operations and/or a sequence of performing the one or more operations to determine the time data. For example, a manner of time data generation may indicate one or more clock cycles of the plurality of clock cycles according to the available frequency at which to increment the time data, to not increment the time data, to perform multiple increments, etc. Based on identifying the manner of time data generation, the time data management system can utilize the corresponding one or more operations and/or the corresponding sequence to determine the time data.

The time data management system may perform one or more functions (e.g., performance tracking, process execution, process scheduling, performance calculating, etc.) using the time data. For example, the time data management system may schedule performance of a process at a particular interval of the time data. In some cases, the time data management system may provide the time data to a computing system (e.g., one or more components of the computing system) and the computing system may perform one or more functions based on the time data. In some cases, the computing system may be separate and distinct from the time data management system. As the time data is determined according to the nominal frequency, the time data management system can enable the performance of functions according to such time data without implementation of a clock at the nominal frequency.

As will be appreciated by one of skill in the art in light of the present disclosure, the embodiments disclosed herein improve the ability of computing systems to perform functions at a nominal frequency without the use of a clock operating at the nominal frequency. Moreover, the presently disclosed embodiments address technical problems inherent within computing systems; specifically, the difficulties of enabling the performance of functions at different nominal frequencies that may not correspond to frequencies of available clocks within the computing systems. These technical problems are addressed by the various technical solutions described herein, including the generation of time data according to the nominal frequency using an available frequency. Thus, the present disclosure represents an improvement on existing computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which user computing devices 102 may interact with a computing system 110 via a network 104. By way of illustration, various example user computing devices 102 are shown in communication with the computing system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The computing system 110 may provide the user computing devices 102 with one or more user interfaces, command-line interfaces (CLI), application programing interfaces (API), and/or other programmatic interfaces for providing nominal frequencies. Although one or more embodiments may be described herein as using a user interface, it should be appreciated that such embodiments may, additionally or alternatively, use any CLIs, APIs, or other programmatic interfaces.

The user computing devices 102 and the computing system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The computing system 110 includes one or more component(s) 120 and one or more clock(s) 122. For example, the one or more component(s) 120 may include an interconnect (e.g., a peripheral component interconnect), a bus (e.g., a universal serial bus), a microprocessor, a port (e.g., an accelerated graphics port), a sub-system of the computing system, etc. The one or more clock(s) 122 may include system clocks and/or component clocks. For example, the computing system 110 may utilize the output of a system clock to perform system functions (e.g., determine system performance) and the one or more component(s) 120 may utilize one or more component clocks to perform component functions (e.g., determine component performance).

In FIG. 1, users, by way of user computing devices 102, may interact with the computing system to provide a nominal frequency (e.g., an identifier of the nominal frequency), and establish rules or logic defining when and how such nominal frequency should be utilized by the computing system 110. For example, a user may desire a particular component of component(s) of the computing system 110 to operate according to the nominal frequency and the users may provide, via the user computing devices 102, an identifier of the nominal frequency and an identifier of the component. One way of operating the component according to the nominal frequency would be to initialize a component clock operating according to the nominal frequency. In order to avoid the complexity and inefficiency of this process (which could be exacerbated as additional nominal frequencies are utilized), the user can provide, via the user computing devices 102, the nominal frequency 135 such that the computing system can generate according to the nominal frequency 135 and based on an available frequency 133.

To enable generation of the time data, the computing system 110 includes a time data management system 130. In some cases, the computing system 110 may be separate and/or located remotely from the time data management system 130. The time data management system 130 includes an available frequency data store 132, a nominal frequency data store 134, a time data store 136, and a time data manager 138. The available frequency data store 132 stores an available frequency 133, the nominal frequency data store 134 stores a nominal frequency 135, and the time data store 136 stores time data 137.

The available frequency 133 may be an available frequency such that at least one of the one or more clock(s) 122 operates according to (e.g., provides an output at) the available frequency 133. In some cases, the time data management system 130 may determine the available frequency 133 by monitoring at least one of the one or more clock(s) 122 to determine the frequency at which the at least one clock produces an output (e.g., the available frequency 133). In some cases, the time data management system 130 may obtain an input (e.g., the available frequency 133, an identifier of the available frequency 133, a function to determine the available frequency 133, etc.) from the user computing devices 102. The time data management system 130 may determine the available frequency 133 based on the input provided by the user computing devices 102. In some cases, the time data management system may obtain an input indicative of the available frequency 133 from at least one component, of the one or more component(s) 120, operating according to the available frequency 133. Based on determining the available frequency 133, the time data management system 130 (or a separate component) may store the available frequency 133 in the available frequency data store 132. For example, the time data manager 138 may store the available frequency 133 in the available frequency data store 132.

The nominal frequency 135 may be a nominal frequency such that the value of the nominal frequency 135 can be modified, set, etc. The computing system 110 may not include one or more clock(s) 122 that operate according to (e.g., provides an output at) the nominal frequency 135. In some cases, the time data management system 130 may execute a search function to determine the nominal frequency 135. For example, the time data management system 130 may identify a component of the computing system 110 and may execute a search function (e.g., on a data sheet corresponding to the component) to identify a frequency at which the component may operate. In some cases, the time data management system 130 may obtain an input (e.g., the nominal frequency 135, an identifier of the nominal frequency 135, a function to determine the nominal frequency 135, etc.) from the user computing devices 102. In some embodiments, the input may include a prompt to generate time data 137 according to the nominal frequency 135. The time data management system 130 may determine the nominal frequency 135 based on (e.g., in response to) the input provided by the user computing devices 102. Based on determining the nominal frequency 135, the time data management system 130 (or a separate component) may store the nominal frequency 135 in the nominal frequency data store 134. For example, the time data manager 138 may store the nominal frequency 135 in the nominal frequency data store 134.

To generate the time data 137, the time data manager 138 may identify the available frequency 133 and the nominal frequency 135. In some embodiments, the time data manager 138 may identify the available frequency 133 from a plurality of available frequencies. Based on identifying the available frequency 133 and the nominal frequency 135, the time data manager 138 may compare the available frequency 133 and the nominal frequency 135. For example, the time data manager 138 may compare the available frequency 133 and the nominal frequency 135 to determine whether the available frequency 133 is greater than, less than, equal to, or within a particular frequency range of the nominal frequency 135.

As discussed below, the time data manager 138 may determine a manner of time data generation (e.g., from a plurality of manners of time data generation) based on comparing the available frequency 133 and the nominal frequency 135. For example, the time data manager 138 may determine a first manner of time data generation based on determining the nominal frequency 135 is greater than the available frequency 133 and a second manner of time data generation based on determining that the nominal frequency 135 is less than or equal to the available frequency 133.

All or a portion of the plurality of manners of time data generation may identify one or more operations and/or a sequence to perform the one or more operations to generate the time data 137. The time data manager 138 may identify the one or more operations and/or the sequence based on determining the manner of time data generation.

The time data manager 138 can execute the one or more operations according to the sequence to generate the time data 137. Further, the time data manager 138 may generate a value of the time data 137 at each clock cycle of a plurality of clock cycles according to the available frequency 133 (e.g., as identified by the output of the at least one clock of the one or more clock(s) 122). The plurality of clock cycles may be defined according to the available frequency 133 such that each clock cycle is equal in duration, amount, etc. to one divided by the available frequency 133 (e.g., 1/(available frequency 133) or (available frequency)^−1). For example, the available frequency 133 may be 1000 MHz and the time data manager 138 may generate a value of the time data 137 according to the nominal frequency 135 using the one or more operations according to the sequence every nanosecond (1/1000 MHz) based on the output of at least one clock that operates at 1000 MHz. In another example, the available frequency 133 may be 800 MHz and the time data manager 138 may generate a value of the time data 137 using the one or more operations according to the sequence every 1.25 nanoseconds (1/800 MHz) based on the output of at least one clock that operates at 800 MHz.

Based on generating the value of the time data 137, the time data manager 138 may increment a counter (e.g., a counter of the computing system 110). The time data manager 139 may store the value of the time data 137 and/or identifier of the value in the time data store 136.

As the time data manger 138 can account for determining the time data 137 (e.g., an estimate of an output of a clock operating according to the nominal frequency 135) based on a plurality of clock cycles according to the available frequency 133 (e.g., 1000 MHz), the time data manager 138 can estimate an output of a clock operating according to the nominal frequency 135 without implementing said clock. Instead, the time data manager 138 utilizes the available frequency 133 at which one of the one or more clock(s) 122 operates to provide the estimated output of the clock operating according to the nominal frequency 135.

The computing system 110, a component of the one or more component(s) 120, and/or a separate computing system may utilize the time data 137 (generated according to the nominal frequency 135 and based on the available frequency 133) to perform one or more functions according to the nominal frequency 135 without requiring implementation of a clock that operates according to the nominal frequency 135. For example, the time data manager 138 may provide the time data 137 to the computing system 110, a component, and/or the separate computing system to perform the one or more functions. In another example, the computing system 110, the component, and/or the separate computing system may obtain the time data 137 from the time data store 136.

As discussed above, to determine a manner of time data generation (e.g., how to generate the time data), the time data management system may determine whether the nominal frequency is greater than (e.g., exceeds), is less than, or is equal to the available frequency. For example, the time data management system may compare the nominal frequency and the available frequency and determine whether the nominal frequency is greater than, is less than, or is equal to the available frequency based on the comparison. In some cases, a separate system or component may compare the nominal frequency and the available frequency and provide the comparison to the time data management system.

Based on determining whether the nominal frequency is greater than, is less than, or is equal to the available frequency, the time data management system may identify a manner of time data generation that indicates how to generate the time data. For example, the manner of time data generation may indicate one or more operations and/or a sequence in which to perform operations to generate the time data.

The time data management system may identify a first manner of time data generation based on determining that the nominal frequency is greater than the available frequency and may identify a second manner of time data generation based on determining that the nominal frequency is less than or is equal to the available frequency. The time data management system may identify a manner of time data generation based on a relationship between the nominal frequency and the available frequency (e.g., whether the nominal frequency is greater than, less than, equal to, within a particular range of, etc. the available frequency) as the time data management system may modify how time data is generated according to the relationship (e.g., the operations to generate the time data, the sequence of performing the operations, etc.). While a value of time data determined according to the available frequency may be incremented uniformly at each clock cycle of a plurality of clock cycles defined according to the available frequency, the value of the time data determined according to the nominal frequency may not be incremented uniformly at each clock cycle of the plurality of clock cycles defined according to the available frequency. The non-uniform increments may be based on the difference between the nominal frequency and the available frequency. For example, if the nominal frequency (e.g., 1000 MHz) is greater than the available frequency (e.g., 800 MHz), the time data management system may identify one or more clock cycles of the plurality of clock cycles according to the available frequency in which to increment the value of time data according to the nominal frequency multiple increments (e.g., from 1 to 3) to account for the nominal frequency being a greater frequency as compared to the available frequency. In another example, if the nominal frequency (e.g., 1000 MHz) is less than the available frequency (e.g., 1400 MHz), the time data management system may identify one or more clock cycles of the plurality of clock cycles according to the available frequency in which to maintain a value of the time data from a prior clock cycle (e.g., not increment the value) to account for the nominal frequency being a lesser frequency as compared to the available frequency. Each manner of time data generation may identify one or more operations and/or a sequence of operations to account for the difference between the available frequency and the nominal frequency.

To identify a manner of time data generation, the time data management system may exclude (e.g., may not select, may not identify, etc.) one or more manners of time data generation that may not account for the difference between the available frequency and the nominal frequency. For example, if the nominal frequency is greater than the available frequency, the time data management system may exclude manners of time data generation that include operations to maintain the value of the time data from a prior clock cycle (as this may exacerbate the difference between the time data and time data generated according to a clock operating according to the available frequency). In another example, if the nominal frequency is less than the available frequency, the time data management system may exclude manners of time data generation that include operations to increment the value of the time data multiple increments (as this may exacerbate the difference between the time data and time data generated according to a clock operating according to the available frequency).

In some cases, the time data management system may identify a subset of a plurality of manners of time data generation based on determining whether the nominal frequency is greater than, is less than, or is equal to the available frequency and may select a manner of time data generation from the subset of the plurality of manners of time data generation. For example, the time data management system may identify a first manner of time data generation and a second manner of time data generation based on determining that the nominal frequency is greater than the available frequency and may select either the first manner of time data generation or the second manner of time data generation. Each manner of time data generation of the subset of the plurality of manners of time data generation may identify one or more operations and/or a sequence of operations that account for the difference between the available frequency and the nominal frequency.

All or a portion of the manners of time data generation (e.g., of the subset of the plurality of manners of time data generation) may include different operations, different sequences, etc. to generate the time data. As each manner of time data generation may include different operations, different sequences, etc. to generate the time data, each manner of time data generation may generate time data with a different accuracy, efficiency, speed, etc. For example, a first manner of time data generation that includes 4 operations may generate more accurate time data but at a lower speed as compared to time data generated by a second manner of time data generation that includes 3 operations (based on the 4 operations resulting in more accurate time data as compared to the 3 operations but requiring more time to implement). In another example, a first manner of time data generation that includes a complex operation (e.g., an operation that includes multiplication, division, etc.) may generate more accurate time data but at a lower speed as compared to time data generated by a second manner of time data generation that includes a simpler operation as compared to the complex operation (e.g., an operation that includes addition, subtraction, etc.) (based on the complex operation resulting in more accurate time data as compared to the simpler operation requiring more time to implement).

In some cases, the time data management system may determine an accuracy, efficiency, speed, etc. of all or a portion of the manners of time data generation. The time data management system may determine the accuracy, efficiency, speed, etc. by generating time data according to the manner of time data generation. The time data management system may compare the time data to time data generated according to a clock operating at the nominal frequency (e.g., to determine an accuracy). The time data management system may determine a time to perform operations to generate the time data (e.g., to determine a speed).

In some cases, the time data management system may provide the manner of time data generation (or the subset of the plurality of manners of time data generation) to a user computing device. For example, the time data management system may provide the subset of the plurality of manners of time data generation to the user computing device for selection of a particular manner of time data generation. The time data management system may obtain, from the user computing device, the selection of the particular manner of time data generation.

In some cases, the time data management system may obtain selection data. The selection data may include instructions to select one or more manners of time data generation as compared to other manners of time data generation (e.g., a preference for the one or more manners of time data generation). In some cases, the selection data may identify a selection of accuracy, efficiency, speed, etc. (e.g., the selection data may indicate that speed is prioritized as compared to accuracy). For example, the time data management system may provide an accuracy, efficiency, speed, etc. of all or a portion of the manners of time data generation such that the manner of time data generation and a corresponding accuracy, efficiency, speed, etc. can be selected. In another example, the time data management system may identify a manner of time data generation (from the subset of the plurality of manners of time data generation) that is more efficient, more accurate, quicker, etc. as compared to other manners of time data generation from the subset of the plurality of manners of time data generation based on the selection data indicating a preference for speed, efficiency, accuracy, etc. Specifically, a user computing device may provide input indicating a preference for accurate time data and the time data management system may compare manners of time data generation to identify a manner of time data generation that results in more accurate time data as compared to other manners of time data generation (the accuracy determined relative to time data generated based on a clock operating at the nominal frequency).

As discussed above, all or a portion of the manners of time data generation may identify one or more operations to be performed to generate the time data. For example, a manner of time data generation may include one or more operations from Equations 1-14 as discussed below. Further, each manner of time data generation may identify a sequence in which to perform the one or more operations from Equations 1-14 to generate the time data. In Equations 1-14, $r_i$ may be a remainder for a current clock cycle, $r_{i+1}$ may be a remainder for a subsequent clock cycle (e.g., subsequent to the current clock cycle), $f_n$ may be a nominal frequency, $f_{ns}$ may be a scaled nominal frequency, $f_a$ may be an available frequency, $f_{as}$ may be a scaled available frequency, x may be a scaling factor, $c_i$ may be time data for the current clock cycle (e.g., a count for the current clock cycle), and $c_{i+1}$ may be time data for the subsequent clock cycle (e.g., a count for the subsequent clock cycle).

The time data management system may perform the one or more operations in all or a portion of the clock cycles of a plurality of clock cycles according to the available frequency. For example, the available frequency may be 500 MHz and the time data management system may perform the one or more operations once every two nanoseconds (1/500 MHz). In some cases, the time data management system may perform a first subset of the one or more operations in a first clock cycle, a second subset of the one or more operations in a second clock cycle, a third subset of the one or more operations in a third clock cycle, etc.

To further illustrate how the one or more operations are performed to generate the time data, FIGS. 2A, 2B, 2C, and 2D are pictorial diagrams of example time data generated based on the performance of one or more operations according to a particular sequence. The generation of the time data may occur, for example, at each clock cycle of a plurality of clock cycles according to an available frequency. Further, the generation of the time data may occur in response to an identification of a nominal frequency and an available frequency and a comparison of the nominal frequency and the available frequency.

As discussed above, the time data management system may determine that the nominal frequency is less than or equal to the available frequency. Based on determining that the nominal frequency is less than or equal to the available frequency, the time data management system may determine a manner of time data generation for the generation of time data where the nominal frequency is less than or equal to the available frequency. The manner of time data generation may indicate one or more operations to generate the time and a sequence to perform the one or more operations. Based on the nominal frequency being less than or equal to the available frequency, the one or more operations of the manner of time data generation may include performance of all or a portion of Equations 1-6 as shown below. A user computing device may provide input selecting a particular combination of Equations 1-6 for performance and/or a preference for accuracy, efficiency, speed, etc. and based on the input, the time data management system may identify the particular combination of Equations 1-6. As discussed below, in the event that the nominal frequency is greater than the available frequency, the one or more operations of the manner of time data generation may include performance of different equations (e.g., Equations 7-10).

Based on identifying the available frequency and the nominal frequency, the time data management system may apply at least one of Equation 1 or 2 to determine a remainder for a subsequent clock cycle (e.g., immediately subsequent in time to the current clock cycle). In some cases, for an initial clock cycle (e.g., a first clock cycle), the remainder may be initialized at 0. In other cases, for an initial clock cycle, the remainder may be initialized at any other value.

$$\text{for } r_i < f_n, \ r_{i+1} = r_i + f_a - f_n \qquad \text{Equation 1}$$

As discussed in Equation 1, the time data management system may apply Equation 1 to determine the remainder for the subsequent clock cycle based on determining that the remainder for the current clock cycle is less than the nominal frequency. In some cases, the time data management system may apply Equation 1 to determine the remainder for the current clock cycle based on determining that the remainder from a prior clock cycle (e.g., an immediately prior clock cycle) is less than the nominal frequency. To apply Equation 1, the time data management system may set the remainder for the subsequent clock cycle as equal to the remainder for the current clock cycle plus the available frequency and minus the nominal frequency. In some cases, to apply Equation 1, the time data management system may set the remainder for the current clock cycle as equal to the remainder for the prior clock cycle plus the available frequency and minus the nominal frequency.

$$\text{for } r_i \geq f_n, \ r_{i+1} = r_i - f_n \qquad \text{Equation 2}$$

As discussed in Equation 2, the time data management system may apply Equation 2 to determine the remainder for the subsequent clock cycle based on determining that the remainder for the current clock cycle is greater than or equal to the nominal frequency. In some cases, the time data management system may apply Equation 2 to determine the remainder for the current clock cycle based on determining that the remainder for the prior clock cycle is greater than or equal to the nominal frequency. To apply Equation 2, the time data management system may set the remainder for the subsequent clock cycle as equal to the remainder for the current clock cycle minus the nominal frequency. In some cases, to apply Equation 2, the time data management system may set the remainder for the current clock cycle as equal to the remainder for the prior clock cycle minus the nominal frequency.

Based on the remainder for a given clock cycle (or a remainder for a prior clock cycle), the time data management system may apply at least one of Equation 3 or Equation 4 to generate time data according to the nominal frequency and based on the available frequency. The time data management system may generate time data according to the nominal frequency for each clock cycle of a plurality of clock cycles according to the available frequency. In some cases, for an initial clock cycle (e.g., a first clock cycle), the time data may be initialized at 0. In other cases, for an initial clock cycle, the time data may be initialized at any other value.

$$\text{for } r_i < f_n, \ c_{i+1} = c_i + 1 \qquad \text{Equation 3}$$

As discussed in Equation 3, the time data management system may apply Equation 3 to generate the time data for the subsequent clock cycle based on determining that the remainder for the current clock cycle is less than the nominal frequency. In some cases, the time data management system may apply Equation 3 to generate the time data for the current clock cycle based on determining that the remainder from a prior clock cycle is less than the nominal frequency. To apply Equation 3, the time data management system may set the time data for the subsequent clock cycle as equal to the time data for the current clock cycle plus one. In some cases, to apply Equation 3, the time data management system may set the time data for the current clock cycle as equal to the time data for the prior clock cycle plus one.

$$\text{for } r_i \geq f_n, \ c_{i+1} = c_i \qquad \text{Equation 4}$$

As discussed in Equation 4, the time data management system may apply Equation 4 to generate the time data for the subsequent clock cycle based on determining that the remainder for the current clock cycle is greater than or equal to the nominal frequency. In some cases, the time data management system may apply Equation 4 to generate the time data for the current clock cycle based on determining that the remainder from a prior clock cycle is less than the nominal frequency. To apply Equation 4, the time data management system may set the time data for the subsequent clock cycle as equal to the time data for the current clock cycle. In some cases, to apply Equation 4, the time data management system may set the time data for the current clock cycle as equal to the time data for the prior clock cycle.

To further illustrate how operations corresponding to Equations 1-4 are performed, FIG. 2A is a pictorial diagram 200A of example time data generated based on the performance of the operations. In the example of FIG. 2A, the available frequency 201A is 1400 MHz and the nominal frequency 201B is 1000 MHz. For example, the available frequency 201A may be an available frequency of a clock of a computing system (e.g., a component clock) and the nominal frequency 201B may be a nominal frequency (e.g., the computing system may not include a clock operating at the nominal frequency).

To determine a manner of time data generation, the time data management system may compare the available frequency 201A and the nominal frequency 201B. Based on comparing the available frequency 201A and the nominal frequency 201B, the time data management system may determine that the nominal frequency 201B is less than or equal to the available frequency 201A. Based on determining that the nominal frequency 201B is less than or equal to the available frequency 201A, the time data management system may determine the manner of time data generation. In the example of FIG. 2A, the manner of time data generation may identify Equations 1-4 and a sequence of performing Equations 1-4 for each clock cycle according to the available frequency 201A (e.g., perform Equation 1 followed by Equation 3 or Equation 2 followed by Equation 4).

As illustrated in FIG. 2A, the time data management system may utilize first time data 206 according to the available frequency 201A and a remainder 202 to generate second time data 204 according to the nominal frequency 201B. The first time data 206 includes a counter value based on the available frequency 201A (e.g., incremented by one at each clock cycle according to the available frequency 201A) and corresponds to a value in real time 208. For example, as shown in FIG. 2A, the available frequency 201A is 1400 MHz, and, therefore, a first clock cycle at the available frequency 201A corresponds to a value of the first time data 206 of 1 and a value in real time 208 of 0.714286 nanoseconds (1/1400 MHz), a second clock cycle at the available frequency 201A corresponds to a value of the first time data 206 of 2 and a value in real time 208 of 1.428571 nanoseconds (2/1400 MHz), a third clock cycle at the available frequency 201A corresponds to a value of the first time data 206 of 3 and a value in real time 208 of 2.142857 nanoseconds (3/1400 MHz), etc. The time data management system may initialize all or a portion of the remainder 202, the second time data 204, the first time data 206, and/or the real time 208 at 0 at an initial or $0^{th}$ clock cycle.

The time data management system may utilize the available frequency 201A, the nominal frequency 201B, and the remainder 202 to generate the second time data 204 at each clock cycle according to the first time data 206. For example, as shown in FIG. 2A, at a $0^{th}$ clock cycle according to the first time data 206, the time data management system determines that the remainder 202 for the $0^{th}$ clock cycle is less than the nominal frequency 201B and accordingly performs Equations 1 and 3 instead of Equations 2 and 4. To perform Equations 1 and 3, the time data management system 1) sets the remainder 202 for the $1^{st}$ clock cycle as equal to the remainder 202 for the $0^{th}$ clock cycle (0) plus the available frequency 201A (1400) minus the nominal frequency 201B (1000) which equals 400 and 2) sets the second time data 204 for the $1^{st}$ clock cycle as equal to the second time data 204 for the $0^{th}$ clock cycle plus one which equals 1.

The time data management system may perform either Equations 1 and 3 or Equations 2 and 4 (depending on the value of the remainder for the prior clock cycle) for each clock cycle according to the first time data 206. Further, the time data management system may store the second time data 204 in a data store (e.g., the time data store 136). In some cases, the time data management system may provide the second time data 204 directly to a component and/or computing system.

As seen in FIG. 2A, the second time data 204 may differ from time data generated based on the output of a clock operating at the nominal frequency 201B. For example, a clock operating at the nominal frequency (1000 MHz) would increment each nanosecond. However, because the second time data 204 is generated according to the nominal frequency 201B but based on the first time data 206, the second time data 204 differs from time data generated based on the output of a clock operating at the nominal frequency 201B. Instead, the time data management system utilizes Equations 1-4 to determine when to increment or pause increments for a particular clock cycle according to the available frequency 201A such that the second time data 204 remains within a particular time range of time data generated based on the output of a clock operating at the nominal frequency 201B (e.g., 0.625 nanoseconds). Further, for one or more clock cycles (e.g., the $7^{th}$ clock cycle, the $14^{th}$ clock cycle, etc.), the second time data 204 may match time data generated based on the output of a clock operating at the nominal frequency 201B.

In some cases, instead of Equation 3 or Equation 4, the time data management system may apply at least one of Equation 5 or Equation 6 to generate time data according to the nominal frequency and based on the available frequency. Further, the manner of time data generation may identify Equation 5 and/or Equation 6 instead of (or in addition to) Equation 3 or Equation 4. For example, a first manner of time data generation may identify 1) Equation 1 and/or Equation 2 and 2) Equation 3 and/or Equation 4 and a second manner of time data generation may identify 1) Equation 1 and/or Equation 2 and 2) Equation 5 and/or Equation 6. While the first manner of time data generation may include a shorter logical path (e.g., may be implemented/executed quicker) as compared to the second manner of time data generation, the second manner of time data generation may be more accurate as compared to the first manner of time data generation (e.g., may more accurately match and/or have less variance with respect to time data generated according to a clock operating based on the nominal frequency). Based on selection data indicating a preference for increased accuracy, the time data management system may utilize the second manner of time data generation and based on selection data indicating a preference for shorter execution time or logical paths, the time data management system may utilize the first manner of time data generation. In another example, a first manner of time data generation may identify Equation 1 and Equation 3, a second manner of time data generation may identify Equation 2 and Equation 4, a third manner of time data generation may identify Equation 1 and Equation 5, and a fourth manner of time data generation may identify Equation 2 and Equation 6.

$$\text{for } r_{i+1} < f_n, \ c_{i+1} = c_i + 1 \qquad \text{Equation 5}$$

As discussed in Equation 5, the time data management system may apply Equation 5 to generate the time data for the subsequent clock cycle based on determining that the remainder for the subsequent clock cycle is less than the nominal frequency. In some cases, the time data management system may apply Equation 5 to generate the time data for the current clock cycle based on determining that the remainder for the current clock cycle is less than the nominal frequency. To apply Equation 5, the time data management system may set the time data for the subsequent clock cycle as equal to the time data for the current clock cycle plus one. In some cases, to apply Equation 5, the time data management system may set the time data for the current clock cycle as equal to the time data for the prior clock cycle plus one.

$$\text{for } r_{i+1} \geq f_n, \quad c_{i+1} = c_i \qquad \text{Equation 6}$$

As discussed in Equation 6, the time data management system may apply Equation 6 to generate the time data for the subsequent clock cycle based on determining that the remainder for the subsequent clock cycle is greater than or equal to the nominal frequency. In some cases, the time data management system may apply Equation 6 to generate the time data for the current clock cycle based on determining that the remainder for the current clock cycle is greater than or equal to the nominal frequency. To apply Equation 6, the time data management system may set the time data for the subsequent clock cycle as equal to the time data for the current clock cycle. In some cases, to apply Equation 6, the time data management system may set the time data for the current clock cycle as equal to the time data for the prior clock cycle.

As discussed above, the time data management system may determine that the nominal frequency is greater than the available frequency. Based on determining that the nominal frequency is greater than the available frequency, the time data management system may determine a manner of time data generation for the generation of time data where the nominal frequency is greater than the available frequency. Based on the nominal frequency being greater than the available frequency, the one or more operations of the manner of time data generation may include performance of all or a portion of Equations 7-10 as shown below. A user computing device may provide input selecting a particular combination of Equations 7-10 for performance and/or a preference for accuracy, efficiency, speed, etc. and based on the input, the time data management system may identify the particular combination of Equations 7-10.

Based on identifying the available frequency and the nominal frequency, the time data management system may apply at least one of Equation 7 or 8 to determine a remainder for a subsequent clock cycle.

$$\text{for } r_i < \left(\left\lfloor\frac{f_n}{f_a}\right\rfloor + 1\right)f_a - f_n, \quad r_{i+1} = r_i + f_n - \left\lfloor\frac{f_n}{f_a}\right\rfloor f_a \qquad \text{Equation 7}$$

As discussed in Equation 7, the time data management system may apply Equation 7 to determine the remainder for the subsequent clock cycle based on determining that the remainder for the current clock cycle is less than the sum of the nominal frequency divided by the available frequency rounded to the nearest whole number plus one multiplied by the available frequency and minus the nominal frequency. In some cases, the time data management system may apply Equation 7 to determine the remainder for the current clock cycle based on determining that the remainder for the prior clock cycle is less than the sum of the nominal frequency divided by the available frequency rounded to the nearest whole number plus one multiplied by the available frequency and minus the nominal frequency. In some cases, instead of the nominal frequency divided by the available frequency rounded to the nearest whole number, the equation (and any other equation recited herein) may include the nominal frequency divided by the available frequency rounded down to the nearest whole number, rounded up to the nearest whole number, truncated, etc. To apply Equation 7, the time data management system may set the remainder for the subsequent clock cycle as equal to the remainder for the current clock cycle plus the nominal frequency and minus the nominal frequency divided by the available frequency rounded to the nearest whole number multiplied by the available frequency. In some cases, to apply Equation 7, the time data management system may set the remainder for the current clock cycle as equal to the remainder for the prior clock cycle plus the nominal frequency and minus the nominal frequency divided by the available frequency rounded to the nearest whole number multiplied by the available frequency.

$$\text{for } r_i \geq \left(\left\lfloor\frac{f_n}{f_a}\right\rfloor + 1\right)f_a - f_n, \quad r_{i+1} = r_i + f_n - \left(\left\lfloor\frac{f_n}{f_a}\right\rfloor + 1\right)f_a \qquad \text{Equation 8}$$

As discussed in Equation 8, the time data management system may apply Equation 8 to determine the remainder for the subsequent clock cycle based on determining that the remainder for the current clock cycle is greater than or equal to the sum of the nominal frequency divided by the available frequency rounded to the nearest whole number plus one multiplied by the available frequency and minus the nominal frequency. In some cases, the time data management system may apply Equation 8 to determine the remainder for the current clock cycle based on determining that the remainder for the prior clock cycle is greater than or equal to the sum of the nominal frequency divided by the available frequency rounded to the nearest whole number plus one multiplied by the available frequency and minus the nominal frequency. To apply Equation 8, the time data management system may set the remainder for the subsequent clock cycle as equal to the remainder for the current clock cycle plus the nominal frequency and minus the nominal frequency divided by the available frequency rounded to the nearest whole number plus one and multiplied by the available frequency. In some cases, to apply Equation 8, the time data management system may set the remainder for the current clock cycle as equal to the remainder for the prior clock cycle plus the nominal frequency and minus the nominal frequency divided by the available frequency rounded to the nearest whole number plus one and multiplied by the available frequency.

Based on the remainder for a given clock cycle, the time data management system may apply at least one of Equation 9 or 10 to generate time data according to the nominal frequency and based on the available frequency.

$$\text{for } r_i < \left(\left\lfloor\frac{f_n}{f_a}\right\rfloor + 1\right)f_a - f_n, \quad c_{i+1} = c_i + \left\lfloor\frac{f_n}{f_a}\right\rfloor \qquad \text{Equation 9}$$

As discussed in Equation 9, the time data management system may apply Equation 9 to generate the time data for the subsequent clock cycle based on determining that the remainder for the current clock cycle is less than the sum of the nominal frequency divided by the available frequency rounded to the nearest whole number plus one multiplied by the available frequency and minus the nominal frequency. In some cases, the time data management system may apply Equation 9 to generate the time data for the current clock cycle based on determining that the remainder for the prior clock cycle is less than the sum of the nominal frequency divided by the available frequency rounded to the nearest whole number plus one multiplied by the available frequency and minus the nominal frequency. To apply Equation 9, the time data management system may set the time data for the subsequent clock cycle as equal to the time data for the current clock cycle plus the nominal frequency divided by the available frequency rounded to the nearest whole number. In some cases, to apply Equation 9, the time data management system may set the time data for the current clock cycle as equal to the time data for the prior clock cycle plus the nominal frequency divided by the available frequency rounded to the nearest whole number.

$$\text{for } r_i \geq \left(\left\lfloor\frac{f_n}{f_a}\right\rfloor+1\right)f_a - f_n, \quad c_{i+1} = c_i + \left\lfloor\frac{f_n}{f_a}\right\rfloor+1 \qquad \text{Equation 10}$$

As discussed in Equation 10, the time data management system may apply Equation 10 to generate the time data for the subsequent clock cycle based on determining that the remainder for the current clock cycle is greater than or equal to the sum of the nominal frequency divided by the available frequency rounded to the nearest whole number plus one multiplied by the available frequency and minus the nominal frequency. In some cases, the time data management system may apply Equation 10 to generate the time data for the current clock cycle based on determining that the remainder for the prior clock cycle is greater than or equal to the sum of the nominal frequency divided by the available frequency rounded to the nearest whole number plus one multiplied by the available frequency and minus the nominal frequency. To apply Equation 10, the time data management system may set the time data for the subsequent clock cycle as equal to the time data for the current clock cycle plus the nominal frequency divided by the available frequency rounded to the nearest whole number plus one. In some cases, to apply Equation 10, the time data management system may set the time data for the current clock cycle as equal to the time data for the prior clock cycle plus the nominal frequency divided by the available frequency rounded to the nearest whole number plus one.

To further illustrate how operations corresponding to Equations 7-10 are performed, FIG. 2B is a pictorial diagram 200B of example time data generated based on the performance of the operations. In the example of FIG. 2B, the available frequency 211A is 800 MHz and the nominal frequency is 211B is 1000 MHz.

To determine a manner of time data generation, the time data management system may compare the available frequency 211A and the nominal frequency 211B. Based on comparing the available frequency 211A and the nominal frequency 211B, the time data management system may determine that the nominal frequency 211B is greater than the available frequency 211A. Based on determining that the nominal frequency 211B is greater than the available frequency 211A, the time data management system may determine the manner of time data generation. In the example of FIG. 2B, the manner of time data generation may identify Equations 7-10 and a sequence of performing Equations 7-10 for each clock cycle according to the available frequency 211A (e.g., perform Equation 7 followed by Equation 9 or Equation 8 followed by Equation 10).

As shown in FIG. 2B, the available frequency 211A is 800 MHz, and, therefore, a first clock cycle at the available frequency 211A corresponds to a value of the first time data 216 of 1 and a value in real time 218 of 1.25 nanoseconds (1/800 MHz), a second clock cycle at the available frequency 211A corresponds to a value of the first time data 216 of 2 and a value in real time 218 of 2.5 nanoseconds (2/800 MHz), a third clock cycle at the available frequency 211A corresponds to a value of the first time data 216 of 3 and a value in real time 218 of 3.75 nanoseconds (3/800 MHz), etc.

The time data management system may utilize the available frequency 211A, the nominal frequency 211B, and a remainder 212 to generate second time data 214 at each clock cycle according to the first time data 216. For example, as shown in FIG. 2B, at a $0^{th}$ clock cycle according to the first time data 216, the time data management system determines that the remainder 212 for the $0^{th}$ clock cycle is less than the sum of the nominal frequency divided by the available frequency rounded to the nearest whole number (1) plus one multiplied by the available frequency (1600) and minus the nominal frequency (600) and accordingly performs Equations 7 and 9 instead of Equations 8 and 10. To perform Equations 7 and 9, the time data management system 1) sets the remainder 212 for the $1^{st}$ clock cycle as equal to the remainder 212 for the $0^{th}$ clock cycle plus the nominal frequency 211B and minus the nominal frequency divided by the available frequency rounded to the nearest whole number multiplied by the available frequency which equals 200 and 2) sets the second time data 214 for the $1^{st}$ clock cycle as equal to the second time data 214 for the $0^{th}$ clock cycle plus the nominal frequency divided by the available frequency rounded to the nearest whole number which equals 1.

The time data management system may perform either Equations 7 and 9 or Equations 8 and 10 (depending on the value of the remainder for the prior clock cycle) for each clock cycle according to the first time data 216. Further, the time data management system may store the second time data 204 in a data store (e.g., the time data store 136).

As seen in FIG. 2B, the second time data 214 may differ from time data generated based on the output of a clock operating at the nominal frequency 211B. The time data management system utilizes Equations 7-10 to determine when to increment or skip increments for a particular clock cycle according to the available frequency 211A such that the second time data 214 remains within a particular time range of time data generated based on the output of a clock operating at the nominal frequency 211B (e.g., 0.5 nanoseconds). Further, for one or more clock cycles (e.g., the $4^{th}$ clock cycle, the $8^{th}$ clock cycle, the $12^{th}$ clock cycle, etc.), the second time data 214 may match time data generated based on the output of a clock operating at the nominal frequency 211B.

In some cases, the time data management system may determine that the nominal frequency is greater than the available frequency. However, instead of utilizing all or a portion of Equations 7, 8, 9, or 10 as discussed above, based on determining that the nominal frequency is greater than the available frequency, the time data management system may scale one or more of the nominal frequency or the available frequency such that the nominal frequency is less than or equal to the available frequency. For example, where the nominal frequency is 1000 MHz and the available frequency is 800 MHz, the time data management system may scale the nominal frequency by a factor of 2 such that the nominal frequency is 500 MHz and/or may scale the available frequency by a factor of 2 such that the available frequency is 1600 MHz. The time data management system may utilize Equation 11 and/or 12 to scale the nominal frequency and/or the available frequency as shown below.

$$f_{ns} = \frac{f_n}{x} \text{ such that } f_{ns} \leq f_a \qquad \text{Equation 11}$$

As discussed in Equation 11, the time data management system may apply Equation 11 to determine the scaled nominal frequency. To apply Equation 11, the time data management system may divide the nominal frequency by a scaling factor such that the scaled nominal frequency is less than or equal to the available frequency (or the scaled available frequency).

$$f_{as} = f_a x \text{ such that } f_{as} \geq f_n \qquad \text{Equation 12}$$

As discussed in Equation 12, the time data management system may apply Equation 12 to determine the scaled available frequency. To apply Equation 12, the time data management system may multiply the available frequency by a scaling factor such that the scaled available frequency is greater than or equal to the nominal frequency (or the scaled nominal frequency).

In some cases, the time data management system may scale the available frequency and the nominal frequency. Further, the time data management system may scale the available frequency and the nominal frequency by the same scaling factor or a different scaling factor. For example, if the available frequency is 250 MHz and the nominal frequency is 900 MHz, the time data management system may scale the available frequency and the nominal frequency by 2 or may scale the available frequency by 3 and the nominal frequency by 1.5.

Based on scaling one or more of the nominal frequency or the available frequency, the time data management system may determine a manner of time data generation that indicates one or more operations to generate the time data. The one or more operations may include performance of all or a portion of Equations 1-6 (as modified to account for the scaled nominal frequency and/or the scaled available frequency) and/or Equations 13-14 as shown below.

To determine the remainder, the time data management system may utilize all or a portion of Equations 1-2, however, the time data management may substitute the scaled nominal frequency for the nominal frequency and/or may substitute the scaled available frequency for the available frequency.

In some cases, the time data management system may utilize all or a portion of Equations 3-6, as discussed above, to generate the time data based on the determined remainder. In some cases, the time data management system may utilize all or a portion of Equations 13-14 to generate the time data.

$$\text{for } r_i < f_n, \ c_{i+1} = c_i + x \qquad \text{Equation 13}$$

As discussed in Equation 13, the time data management system may apply Equation 13 to generate the time data for the subsequent clock cycle based on determining that the remainder for the current clock cycle is less than the nominal frequency (or the scaled nominal frequency). In some cases, the time data management system may apply Equation 13 to generate the time data for the current clock cycle based on determining that the remainder for the prior clock cycle is less than the nominal frequency (or the scaled nominal frequency). To apply Equation 13, the time data management system may set the time data for the subsequent clock cycle as equal to the time data for the current clock cycle plus the scaling factor. In some cases, to apply Equation 13, the time data management system may set the time data for the current clock cycle as equal to the time data for the prior clock cycle plus the scaling factor.

$$\text{for } r_{i+1} < f_n, \ c_{i+1} = c_i + x \qquad \text{Equation 14}$$

As discussed in Equation 14, the time data management system may apply Equation 14 to generate the time data for the subsequent clock cycle based on determining that the remainder for the subsequent clock cycle is less than the nominal frequency (or the scaled nominal frequency). In some cases, the time data management system may apply Equation 14 to generate the time data for the current clock cycle based on determining that the remainder for the current clock cycle is less than the nominal frequency (or the scaled nominal frequency). To apply Equation 14, the time data management system may set the time data for the subsequent clock cycle as equal to the time data for the current clock cycle plus the scaling factor. In some cases, the time data management system may set the time data for the subsequent clock cycle as equal to the time data for the current clock cycle plus 1 divided by the scaling factor. In some cases, to apply Equation 14, the time data management system may set the time data for the current clock cycle as equal to the time data for the prior clock cycle plus the scaling factor.

To further illustrate how operations corresponding to Equations 11-14 are performed, FIG. 2C and FIG. 2D are a pictorial diagrams 200C. 200D of example time data generated based on the performance of the operations. In the example of FIG. 2C and FIG. 2D, the available frequency 221A is 800 MHz and the nominal frequency is 221B is 1000 MHz.

Based on comparing the available frequency 221A and the nominal frequency 221B, the time data management system may determine that the nominal frequency 221B is greater than the available frequency 221A. Based on determining that the nominal frequency 221B is greater than the available frequency 221A, the time data management system may determine the manner of time data generation. However, instead of utilizing Equations 7-10 as discussed above with regard to FIG. 2B, the manner of time data generation may identify Equations 1-4 and 11-14 and a sequence of performing Equations 1-4 and 11-14 for all or a portion of clock cycles according to the available frequency 221A (e.g., perform Equation 11 to scale the nominal frequency and, using the nominal frequency, perform 1) Equation 1 followed by Equation 3, 2) Equation 1 followed by Equation 13, 3) Equation 2 followed by Equation 4, or 4) Equation 2 followed by Equation 14).

As shown in FIG. 2C, the time data management system may scale the nominal frequency 221B such that the scaled nominal frequency 223 is less than or equal to the available frequency 221A. In the example of FIG. 2C, the time data management system scales the nominal frequency 221B (1000 MHz) by dividing the nominal frequency 221B by 2 (the scaling factor) to generate a scaled nominal frequency 223 (500 MHz).

The time data management system may utilize the available frequency 221A, the scaled nominal frequency 223, the scaling factor, and the remainder 222 to generate the second time data 224 at each clock cycle according to the first time data 226. For example, as shown in FIG. 2C, at a $0^{th}$ clock cycle according to the first time data 226, the time data management system determines that the remainder 222 for the $0^{th}$ clock cycle is less than the scaled nominal frequency 223 and accordingly performs either Equations 1 and 3 or Equations 1 and 13 instead of Equations 2 and 4 or Equations 2 and 14. As shown in FIG. 2C, the time data management system performs Equations 1 and 13, the time data management system 1) sets the remainder 222 for the $1^{st}$ clock cycle as equal to the remainder 222 for the $0^{th}$ clock cycle (0) plus the available frequency 221A (800) minus the scaled nominal frequency 223 (500) which equals 300 and 2) sets the second time data 224 for the $1^{st}$ clock cycle as equal to the second time data 224 for the $0^{th}$ clock cycle plus the scaling factor which equals 2.

It will be understood that the time data management system may perform Equations 1 and 3 instead of Equations 1 and 13. For example, to perform Equations 1 and 3, the time data management system 1) sets the remainder 222 for the $1^{st}$ clock cycle as equal to the remainder 222 for the $0^{th}$ clock cycle (0) plus the available frequency 221A (800) minus the scaled nominal frequency 223 (500) which equals 300 and 2) sets the second time data 224 for the $1^{st}$ clock cycle as equal to the second time data 224 for the $0^{th}$ clock cycle plus one which equals 1. The combination of Equations 1 and 3 as compared the combination of Equations 1 and 13 (and similarly the combination of Equations 2 and 4 as compared to the combination of Equations 2 and 14) may correspond to different execution paths, different execution timing, different time or count variances (with respect to time data generated according to a clock operating at the nominal frequency), different processing requirements, etc.

The time data management system may identify a particular combination of Equations (e.g., the combination of Equations 1 and 3 or the combinations of Equations 1 and 13) based on a selection of a particular manner of time data generation (e.g., based on user input). For example, the user input may identify a preference for a comparatively shorter execution path, a comparatively quicker execution timing, or a comparatively smaller time or count variance.

The time data management system may perform either Equations 1 and 3, Equations 1 and 13, Equations 2 and 4, or Equations 2 and 14 (depending on the value of the remainder for the prior clock cycle and depending on the selection of a particular manner of time data generation) for each clock cycle according to the first time data 226.

As shown in FIG. 2D, the time data management system may scale the available frequency 221A such that the nominal frequency 221B is less than or equal to the scaled available frequency 233. In the example of FIG. 2D, the time data management system scales the available frequency 221A (800 MHz) by multiplying the available frequency 221A by 2 (the scaling factor) to generate a scaled available frequency 233 (1600 MHz).

The time data management system may utilize the nominal frequency 221B, the scaled available frequency 233, the scaling factor, and the remainder 232 to generate the second time data 234 at each clock cycle according to the first time data 236. For example, as shown in FIG. 2D, at a $0^{th}$ clock cycle according to the first time data 236, the time data management system determines that the remainder 232 for the $0^{th}$ clock cycle is less than the nominal frequency 221B and accordingly performs either Equations 1 and 3 or Equations 1 and 13 instead of Equations 2 and 4 or Equations 2 and 14. As shown in FIG. 2D, the time data management system performs Equations 1 and 13, the time data management system 1) sets the remainder 232 for the $1^{st}$ clock cycle as equal to the remainder 222 for the $0^{th}$ clock cycle (0) plus the scaled available frequency 233 (1600) minus the nominal frequency 221B (1000) which equals 600 and 2) sets the second time data 234 for the $1^{st}$ clock cycle as equal to the second time data 234 for the for the $0^{th}$ clock cycle plus two (the scaling factor) which equals 2.

As discussed above, the time data management system may perform Equations 1 and 13 instead of Equations 1 and 3 based on selection of a particular manner of time data generation.

Figure 3:
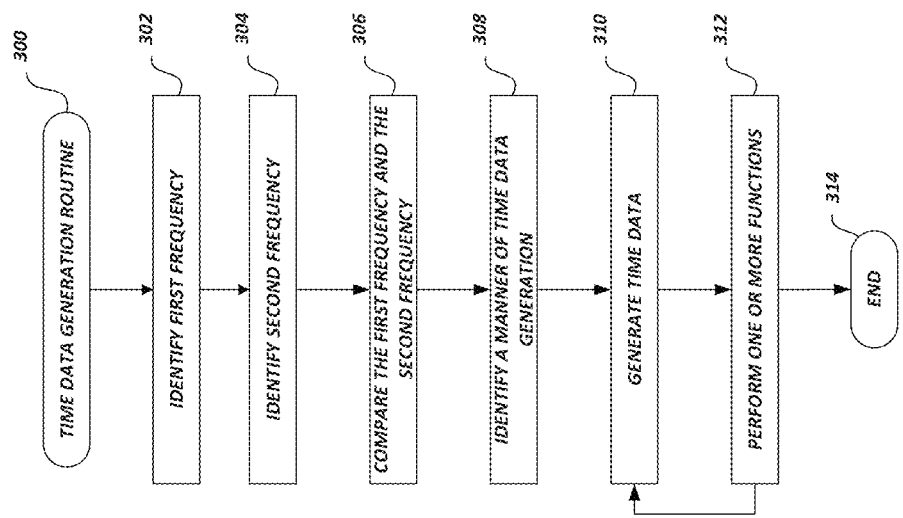
FIG. 3 depicts an illustrative routine for generating time data according to a nominal frequency and based on an available frequency.

With reference to FIG. 3, an illustrative routine 300 will be described for generating time data. The routine 300 may be implemented for example, by the computing system 110 of FIG. 1. In some cases, the routine 300 may be implemented by a processor. In some cases, the routine 300 may be implemented by an integrated circuit (e.g., by a time data generator of an integrated circuit). For example, the time data generator may include or may be a logic unit (e.g., an arithmetic logic unit, a floating point logic unit, etc.), a processor, a general purpose processor (e.g., a microcontroller, microprocessor, embedded processor, digital signal processor, etc.), an application-specific processor, or a processor core (e.g., a processor core on a System-on-a-Chip). In another example, the time data generator may include or may be one or more of a multiplier, an adder, a subtractor, etc. In some cases, the time data generator may include or may be a counter. The time data generator may generate time data, using a counter of the integrated circuit, by providing clock edges for the counter based on a first frequency and a second frequency. For example, the time data generator may implement a counter of the integrated circuit based on the first frequency and the second frequency to provide a particular count. The routine 300 begins at block 302, the computing system identifies a first frequency (e.g., an available frequency). For example, the computing system may obtain an identifier of the first frequency. In some cases, the first frequency may be a component clock frequency indicative of a frequency of clock processes (e.g., oscillations, resonations, vibrations, movements, etc.) of a component clock of the computing system. In some cases, the first frequency may be a component clock frequency indicative of a frequency of clock processes of a component clock of a separate computing system.

Time data (e.g., first time data) may be generated based on the first frequency and may be utilized by a component (e.g., a hardware component) of the computing system to perform one or more functions. For example, the time data may be a count of a first plurality of clock cycles. Further, the count may be a count of the clock processes of the component clock. In some cases, the computing system may identify the first frequency based on monitoring the component clock to identify the component frequency. In some cases, the computing system may obtain the first frequency (or an identifier of the first frequency) from a user computing device or the component.

In order to identify a frequency for the time data, at block 304, the computing system identifies a second frequency (e.g., a nominal frequency). For example, the computing system may obtain an identifier of the second frequency. In some cases, the second frequency may be a system clock frequency (e.g., a frequency for the system), a second component clock frequency, a second system clock frequency (e.g., a frequency for a second system), etc. The computing system may obtain an input (e.g., from a user computing device) indicative of the second frequency. For example, the second frequency may be a desired (e.g., selected, chosen, specified, designated, etc.) frequency (e.g., a desired system clock frequency). The first frequency and the second frequency may have different frequency values (e.g., during the same clock cycle). In some cases, the computing system may obtain the second frequency (or an identifier of the second frequency) from a user computing device or the computing system.

Based on identifying the first frequency and the second frequency, at block 306, the computing system compares the first frequency and the second frequency. The computing system may compare the first frequency and the second frequency to determine a difference between the first frequency and the second frequency. For example, the computing system may compare the first frequency and the second frequency to determine whether the first frequency is less than, equal to, greater than, or within a particular time or count variance of the second frequency.

In some cases, the computing system may scale one or more of the first frequency or the second frequency (e.g., based on comparing the first frequency and the second frequency). For example, the computing system may scale the first frequency such that the scaled first frequency is less than the second frequency.

To determine how to generate time data according to the second frequency and based on the first frequency, at block 308, the computing system identifies a manner of time data generation. The computing system may identify the manner of time data generation based on comparing the first frequency and the second frequency (e.g., based on the difference between the first frequency and the second frequency). For example, the manner of time data generation may include a first manner of time data generation based on the first frequency being equal to or greater than the second frequency or may include a second manner of time data generation based on the first frequency being less than the second frequency. In some cases, the computing system may utilize a scaled first frequency or a scaled second frequency to identify the manner of time data generation.

To identify the manner of time data generation, the computing system may identify (e.g., determine) a set of operations to generate time data and/or a sequence to perform operations. For example, the computing system may determine a set of operations to generate the time data based on determining whether the first frequency is less than the second frequency.

Based on the manner of time data generation, at block 310, the computing system generates time data (e.g., second time data). In some cases, the time data may be a count. For example, the time data may be a count of a second plurality of clock cycles. Further, the count may be a count of the clock processes of a desired system clock operating according to the second frequency. The computing system may generate the time data according to the manner of time data generation (e.g., using the identified set of operations) and based on the first frequency and the second frequency (as discussed above with regard to Equations 1-14 and FIGS. 2A, 2B, 2C, and 2D). For example, the computing system can generate time data for each clock cycle of a first plurality of clock cycles (according to the first frequency), however, the time data may be a count of a second plurality of clock cycles (according to the second frequency) different from the first plurality of clock cycles. Because the computing system may not include a desired system clock operating according to the second frequency, the time data may be an estimated count of the second plurality of clock cycles based on the first frequency, the second frequency, and first time data (e.g., time data generated based on the first frequency).

To generate the time data, for each clock cycle of a plurality of clock cycles (e.g., the first plurality of clock cycles) according to the first frequency, the computing system may determine a remainder based on the first frequency and the second frequency and may generate a value of the time data for the clock cycle based on the remainder. The computing system may determine the remainder for a subsequent clock cycle based on determining whether the remainder for the current clock cycle is less than, equal to, or greater than a value based on the first frequency (as discussed above with regard to Equations 1, 2, 7, and 8). Further, the computing system may utilize the remainder for the current clock cycle to determine a value of the time data for the current clock cycle such that different portions of the time data are based on the remainder for the corresponding clock cycle. For example, the computing system may increment a value of the time data for a prior clock cycle based on determining the remainder for the current clock cycle is less than a value based on the first frequency.

To generate the value of the time data, the computing system may increment or skip one or more increments based on a value of the time data for a prior clock cycle (e.g., immediately prior clock cycle), the first frequency, and the second frequency. For example, the value of the time data for the current clock cycle may be 2 based on the value of the time data for the prior clock cycle being 1. In some cases, the computing system may increment a counter to generate the value of the time data. To skip one or more increments, the computing system may set a value of the time data (e.g., a value of the counter) for a current clock cycle equal to a value of the time data for a prior clock cycle (e.g., pause incrementing) or may increment a value of the time multiple increments in a particular clock cycle (e.g., multiple incrementing).

The time data and time data generated based on the second frequency (e.g., time data generated based on a clock operating according to the second frequency) may have different time data values for one or more clock cycles of the plurality of clock cycles. In some cases, the time data and time data generated based on the second frequency may have the same time data value for one or more clock cycles of the plurality of clock cycles. Therefore, a first portion of the time data may be aligned with (e.g., may match) the second frequency and a second portion of the time data may be misaligned with (e.g., may not match) the second frequency.

Based on the generated time data, at block 312, the computing system performs one or more functions. The one or more functions may include timestamping one or more events, scheduling events, scheduling execution of a program associated with the computing system, (e.g., delaying execution of a program), calculating performance of the computing system, calculating performance of a component of the computing system, recording a time, etc. For example, to timestamp events, the computing system may identify one or more events associated with the computing system and may timestamp the one or more events according to the time data.

In some cases, the computing system may not perform the one or more functions. For example, the computing system may instruct performance of the one or more functions by a separate computing system (e.g., a computing system including the component clock), by a component of the computing system, etc. In another example, the computing may provide the one or more functions to a separate computing system, to a component of the computing system, for execution, etc.

In some cases, the computing system may obtain a third frequency (e.g., an update to the second frequency). For example, a user computing device may provide a third frequency (e.g., an updated second frequency) with a different frequency value as compared to the second frequency. The computing system may generate time data (e.g., updated time data) based on the first frequency and the third frequency. In some embodiments, the routine 300 (or portions of the routine 300) may repeat any number of times. For example, the computing system may generate time data at each clock cycle of a plurality of clock cycles according to the first frequency and may perform one or more functions based on the time data. The routine 300 then ends at block 314.

In various embodiments, the routine 300 may include more, fewer, different, or different combinations of blocks than those depicted in FIG. 3. For example, the routine 300 may, in some embodiments, output an identifier indicative of the time data. As a further example, blocks 302 and/or 304 may be omitted and the computing system may receive an indication of the comparison of the first frequency and the second frequency. As a further example, blocks 306 and 308 may be combined, and the routine 300 may compare the first frequency and the second frequency without separately identify a manner of time data generation. The routine 300 depicted in FIG. 3 is thus understood to be illustrative and not limiting.

Figure 4:
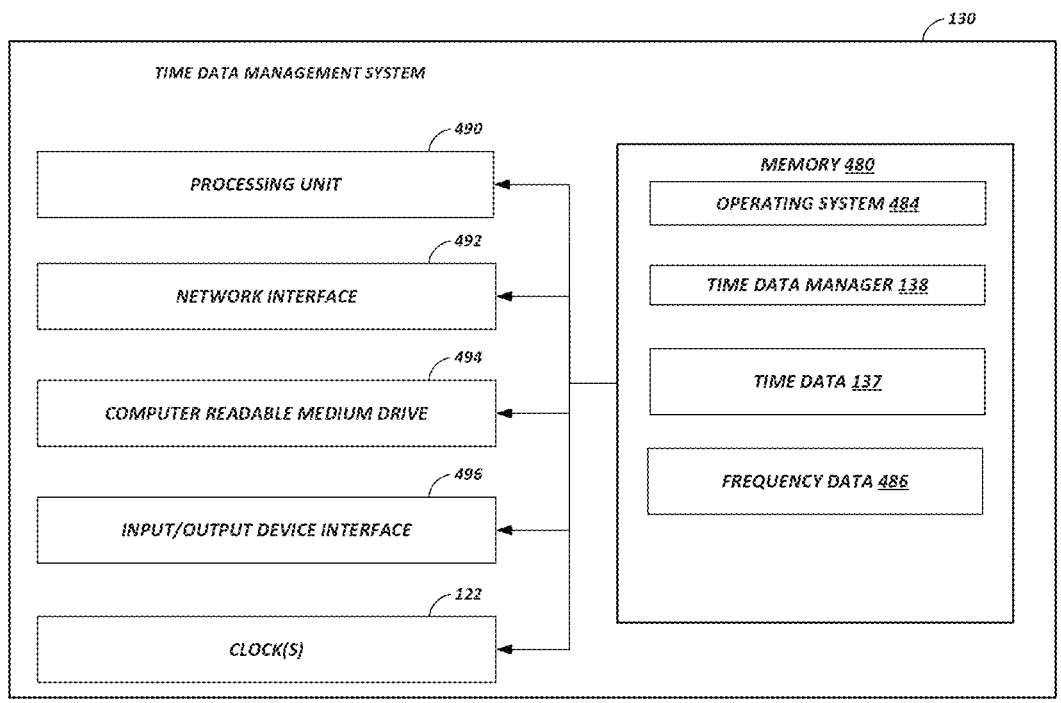
FIG. 4 depicts a general architecture of a computing device or system providing a time data management system that generates time data.

FIG. 4 depicts a general architecture of a computing system (referenced as time data management system 130) that operates to manage (e.g., generate) time data to be utilized to perform one or more functions. The general architecture of the time data management system 130 depicted in FIG. 4 includes an arrangement of computer hardware and software modules that may be used to implement aspects of the present disclosure. For example, aspects of the present disclosure may be implemented by computer hardware modules (e.g., a processor, a processing device, a computing device, etc.) or may be implemented via software modules. In some cases, one or more first aspects of the present disclosure may be implemented by computer hardware modules and one or more second aspects of the present disclosure may be implemented via software modules. The hardware modules may be implemented with physical electronic devices. The time data management system 130 may include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 1.

As illustrated, the time data management system 130 includes a processing unit 490, a network interface 492, a computer readable medium drive 494, an input/output device interface 496, and one or more clock(s) 122, all of which may communicate with one another by way of a communication bus. The network interface 492 may provide connectivity to one or more networks or computing systems. The processing unit 490 may thus receive information and instructions from other computing systems or services via the network 104. The processing unit 240 may also communicate to and from memory 480 and further provide output information for an optional display (not shown) via the input/output device interface 496. The input/output device interface 496 may also accept input from an optional input device (not shown). The one or more clock(s) 122 may include one or more system clocks and/or component clocks that operate according to (e.g., perform one or more clock processes according to) a particular frequency (e.g., as identified by the frequency data 486).

The memory 480 may contain computer program instructions (grouped as units in some embodiments) that the processing unit 490 executes in order to implement one or more aspects of the present disclosure, along with data used to facilitate or support such execution. While shown in FIG. 4 as a single set of memory 480, memory 480 may in practice be divided into tiers, such as primary memory and secondary memory, which tiers may include (but are not limited to) RAM, 3D XPOINT memory, flash memory, magnetic storage, and the like. For example, primary memory may be assumed for the purposes of description to represent a main working memory of the time data management system 130, with a higher speed but lower total capacity than a secondary memory, tertiary memory, etc.

The memory 480 may store an operating system 484 that provides computer program instructions for use by the processing unit 490 in the general administration and operation of the time data management system 130. The memory 480 may further include computer program instructions and other information for implementing aspects of the present disclosure. For example, in one embodiment, the memory 480 includes a time data manager 138 to manage the time data as described above. The memory 480 also includes time data 137 and frequency data 486. The time data 137 and/or the frequency data 486 may be cached locally to the time data management system 130, such as in the form of a memory mapped file. For example, the time data management system 130 may obtain frequency data 486 and store the frequency data 486 in memory 480 based on monitoring the clock(s) 122.

The time data management system 130 of FIG. 4 is one illustrative configuration of such a device, of which others are possible. For example, while shown as a single device, the time data management system 130 may in some embodiments be implemented as a logical device hosted by multiple physical host devices. In other embodiments, the time data management system 130 may be implemented as one or more virtual devices executing on a physical computing device. While described in FIG. 4 as the time data management system 130, similar components may be utilized in some embodiments to implement other devices shown in the environment 100 of FIG. 1.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:
   a hardware component;
   a component clock; and
   a computing device comprising data processing hardware and memory hardware, the computing device configured to:
      determine a component clock frequency indicative of a frequency of clock processes of the component clock, wherein a first count of the clock processes of the component clock is indicative of a first plurality of clock cycles, wherein the first count is utilized by the hardware component to perform one or more functions;
      obtain an input indicative of a desired system clock frequency, wherein the component clock frequency and the desired system clock frequency have different frequency values;
      determine a difference between the component clock frequency and the desired system clock frequency;
      determine a second count indicative of a second plurality of clock cycles based on the difference between the component clock frequency and the desired system clock frequency, wherein to determine the second count, the computing device is further configured to, for each clock cycle of the first plurality of clock cycles:
         determine a remainder based on the component clock frequency and the desired system clock frequency, and
         generate a value of the second count for the clock cycle based on the remainder;
      identify one or more events associated with the system; and
      timestamp the one or more events according to the second count.

2. The system of claim 1, wherein the computing device is further configured to:
   identify a manner of time data generation based on the difference between the component clock frequency and the desired system clock frequency, wherein to determine the second count, the computing device is further configured to determine the second count according to the manner of time data generation, wherein the manner of time data generation comprises:
      a first manner of time data generation based on the component clock frequency being equal to or greater than the desired system clock frequency, or
      a second manner of time data generation based on the component clock frequency being less than the desired system clock frequency.

3. The system of claim 1, wherein, for at least a portion of the second plurality of clock cycles, the value of the second count for the clock cycle and a value of a third count indicative of the second plurality of clock cycles for the clock cycle are different values, wherein the third count is a count of clock processes of a system clock, wherein the desired system clock frequency is indicative of a frequency of the clock processes of the system clock.

4. The system of claim 1, wherein to generate the value of the second count for the clock cycle, the computing device is further configured to:
increment a value of the second count for a prior clock cycle.

5. A method comprising:
obtaining an identifier of a component clock frequency that is indicative of a frequency of clock processes of a component clock, wherein first time measurement data is based on the component clock frequency, wherein the first time measurement data is utilized by a hardware component of a computing system to perform a first function;
obtaining an identifier of a system clock frequency, wherein the component clock frequency and the system clock frequency have different frequency values;
generating a plurality of values of second time measurement data based on one or more remainders, wherein the one or more remainders are determined based on the component clock frequency and the system clock frequency, wherein, for a particular clock cycle, one or more values of the second time measurement data and one or more values of third time measurement data based on the system clock frequency are different values, and wherein each of the first time measurement data, the second time measurement data, and the third time measurement data represents a respective count and comprises a respective measurement of time; and
instructing performance of a second function associated with the computing system based on a value of the plurality of values of the second time measurement data.

6. The method of claim 5, further comprising:
comparing the component clock frequency and the system clock frequency to obtain the one or more remainders, wherein generating the plurality of values of the second time measurement data is further based on comparing the component clock frequency and the system clock frequency.

7. The method of claim 5, wherein instructing performance of the second function comprises instructing at least one of:
calculation of a performance of the computing system;
delayed execution of a program associated with the computing system;
event timestamping; or
time recordation.

8. The method of claim 5, wherein obtaining the identifier of the component clock frequency comprises:
monitoring the component clock to identify the component clock frequency.

9. The method of claim 5, wherein obtaining the identifier of the system clock frequency comprises:
obtaining the identifier of the system clock frequency via a user computing device.

10. The method of claim 5, further comprising:
determining a remainder, of the one or more remainders, for a current clock cycle;
determining whether the remainder for the current clock cycle is equal to or greater than a value based on the component clock frequency; and
determining a remainder, of the one or more remainders, for a subsequent clock cycle based on determining whether the remainder for the current clock cycle is equal to or greater than the value, wherein a first portion of the second time measurement data is based on the remainder for the current clock cycle, and wherein a second portion of the second time measurement data is based on the remainder for the subsequent clock cycle.

11. The method of claim 10, wherein generating the second time measurement data comprises:
determining the remainder for the current clock cycle is less than a value based on the component clock frequency; and
incrementing the second time measurement data based on determining the remainder for the current clock cycle is less than the value.

12. The method of claim 5, further comprising:
comparing the component clock frequency and the system clock frequency; and
scaling one or more of the component clock frequency or the system clock frequency based on comparing the component clock frequency and the system clock frequency to obtain one or more of a scaled component clock frequency or a scaled system clock frequency, wherein generating the second time measurement data is further based on the one or more of the scaled component clock frequency or the scaled system clock frequency.

13. The method of claim 5, further comprising:
determining whether the component clock frequency is less than the system clock frequency; and
determining a set of operations to generate the second time measurement data based on determining whether the component clock frequency is less than the system clock frequency.

14. The method of claim 5, further comprising:
identifying a set of operations of a plurality of sets of operations to generate the second time measurement data, wherein generating the second time measurement data comprises generating the second time measurement data using the set of operations.

15. The method of claim 5, wherein the system clock frequency comprises a desired system clock frequency, wherein a first portion of the second time measurement data is aligned with the desired system clock frequency, and wherein a second portion of the second time measurement data is misaligned with the desired system clock frequency.

16. The method of claim 5, wherein generating the second time measurement data comprises at least one of:
incrementing a counter according to the component clock frequency; or
skipping one or more increments of the counter according to the component clock frequency.

17. The method of claim 16, wherein skipping the one or more increments comprises at least one of:
incrementing the counter multiple increments in a particular clock cycle; or
setting a value of the counter for a current clock cycle equal to a value of the counter for a prior clock cycle.

18. Non-transitory computer-readable media including computer-executable instructions that, when executed by a processor, cause the processor to:
identify a first frequency, wherein first time measurement data is based on the first frequency, wherein the first time measurement data is utilized by a hardware component of a computing system to perform a first function;
identify a second frequency;

generate a plurality of values of second time measurement data based on one or more remainders, wherein the one or more remainders are determined based on the first frequency and the second frequency, wherein, for a particular clock cycle, one or more values of the second time measurement data and one or more values of third time measurement data based on the second frequency are different values, and wherein each of the first time measurement data, the second time measurement data, and the third time measurement data represents a respective count and comprises a respective measurement of time; and provide the second time measurement data to the computing system for performance of a second function associated with the computing system based on a value of the plurality of values of the second time measurement data.

19. The non-transitory computer-readable media of claim 18, wherein execution of the computer-executable instructions by the processor further causes the processor to:

identify a third frequency, wherein the second frequency and the third frequency have different frequency values; and generate fourth time measurement data based on the first frequency and the third frequency.

20. The non-transitory computer-readable media of claim 18, wherein a clock of the computing system oscillates according to the first frequency.

21. An integrated circuit comprising:

a time data generator comprising data processing hardware and memory hardware, the time data generator configured to:

identify a first frequency;

identify a second frequency, wherein the first frequency and the second frequency are different frequencies;

generate a plurality of values of first time measurement data based on one or more remainders, using a counter, wherein the one or more remainders are determined based on the first frequency and the second frequency, wherein, for a particular clock cycle, one or more values of the first time measurement data and one or more values of second time measurement data based on the second frequency are different values, and wherein each of the first time measurement data and the second time measurement data represents a respective count and comprises a respective measurement of time; and provide the first time measurement data for performance of a function based on a value of the plurality of values of the first time measurement data.

* * * * *